Figure 2:
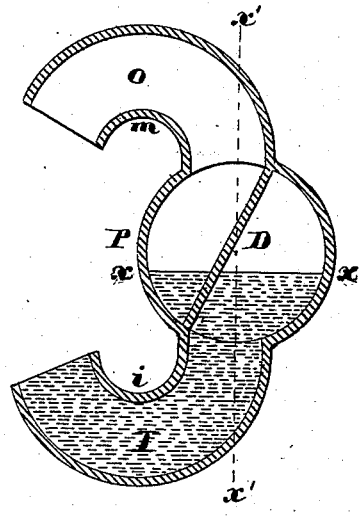

(No Model.)

J. P. PUTNAM.
WATER TRAP.

No. 311,085. Patented Jan. 20, 1885.

Witnesses:
W. W. Swan
Wm. S. Rogers

Inventor:
J. Pickering Putnam.

UNITED STATES PATENT OFFICE.

J. PICKERING PUTNAM, OF BOSTON, MASSACHUSETTS.

WATER-TRAP.

SPECIFICATION forming part of Letters Patent No. 311,085, dated January 20, 1885.

Application filed September 26, 1884. (No model.)

*To all whom it may concern:*

Be it known that I, JOHN PICKERING PUTNAM, of Boston, in the State of Massachusetts, have invented a new and useful Improvement in Water-Traps, of which the following is a full, clear, and exact description, when taken in connection with the accompanying drawings, in which I have represented apparatus embodying the invention as applied to a wash-basin.

The object of the invention, of which the present invention is a modification or division, is to provide the trap with a water seal which will resist suction or siphonage, and at the same time permit the trap to be self-scouring; and the said principal invention consists, mainly, in placing between the lower or inlet bend and the upper or outlet bend of the trap a long, narrow, and low chamber, adapted permanently to hold a thin sheet of water covering superficially a large area as compared with a cross-section of the inlet to the chamber from the lower bend. It is essential that the chamber be low and narrow—that is, that throughout the chamber a cross-section of it at right angles shall not greatly exceed in measurement the measurement of a cross-section of the inlet-passage at or near the entrance of the latter, in order that the chamber may be self-scouring; and it is essential for this purpose that the chamber, being for this purpose small in vertical cross-section, shall be of very considerable length measured horizontally, in order that, while there shall always remain in the trap a quantity of water considerably larger than the quantity required to fill the lower or inlet bend of the trap, this body of water shall be in vertical measurement thin or shallow, with an air-space above it sufficient to allow a column of water or air or of water and air suddenly entering the chamber from the lower bend to pass readily through the thin sheet of water in a vertical direction, and, with scarcely any disturbance to such sheet of water, find an easy passage along the air-space above such sheet of water. In operation, when the water fills the inlet-bend of the trap and lies in a thin and extended sheet in the bottom of the chamber, covering the entrance therein from the lower or inlet bend, and there takes place a rapid flowing of water through the main discharge or soil pipe, with which the trap communicates, the air in the chamber above the thin sheet of water will be sucked out, and to fill the partial vacuum thereby caused the water in the lower bend or dip and air behind will be drawn into the chamber. The water thus entering with great force will easily pass through the thin sheet of water, and then be broken up as it is thrown or deflected from wall to wall in the chamber, while the air following or even entering with it will be drawn into the upper bend or overflow, and, finally, when the siphonage ceases, it will be found that the siphonage has been fed by air alone. In the normal condition of the trap, before the first suction or siphonage takes place, the exact condition which is supposed above does not exist—that is, there is no thin sheet of water until after one action of siphonage, for the interposed chamber will at first be full of water, the level being determined by the overflow; but if the chamber be constructed as hereinafter directed, so that the distance which the water and air entering the chamber from the lower bend must travel horizontally before passing out of the chamber sufficiently exceeds the distance which they must travel vertically within the chamber, and the chamber be so shaped that water entering it with force will be deflected more or less before it can travel the said superior horizontal distance, then, in operation, it will be found that the first siphonage which takes place will only cause the water entering the chamber to fall to the level or shallow depth above supposed, and thereafter the said condition will exist and the subsequent operations occasioned by siphonage will be like the operation first described. The intervening chamber should be large enough to receive and hold the water normally in the lower bend in addition to the shallow body of water which covers its bottom, including the entrance of the inlet from the lower bend, and yet leave an air-space above the water sufficient to allow a free passage of air from end to end; but it is not necessary that the long horizontal distance or space—that is, the distance or space which the water may travel in the chamber on a level—shall be continuous in one direction. It is better that the water be frequently broken up in its passage through the chamber. Moreover, the long horizontal chamber, or the body containing the chamber in its long horizontal form, is liable to sag and lose its operative form, unless extraneous means are taken to prevent its sagging. This troublesome feature is obviated in the compact form of trap hereinafter described and claimed, it being the object of the present divisional application to obtain a separate patent for improvements or modifications upon the invention broadly claimed in my application No. 110,630, of which this is a division, whereby both the chamber is prevented from sagging and the breaking up of the water in the chamber is facilitated.

Figure 1:
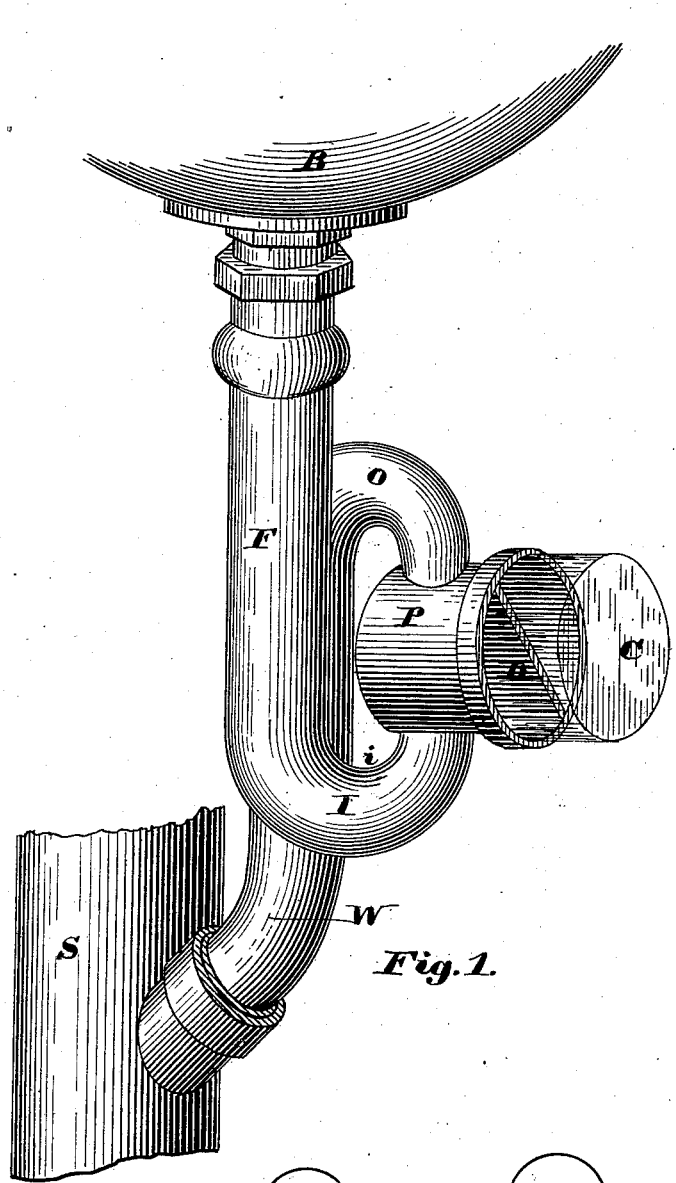
Figure 3:
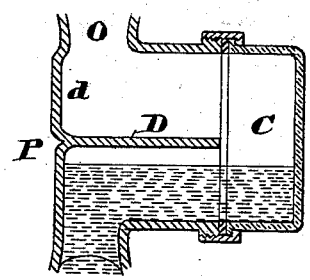

In the drawings I have shown at Figures 1, 2, and 3 a trap embodying such improvements.

Figure 6:
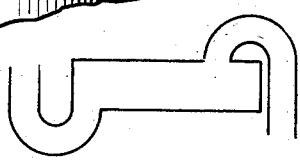
Figure 4:
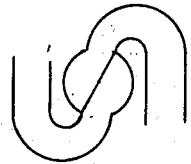
Figure 5:
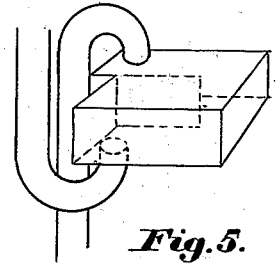

Fig. 1 is a perspective view of the entire apparatus, including, as before stated, a wash-basin to which the trap is applied. Fig. 2 is a transverse section of the same, omitting the basin and main discharge or soil pipe. Fig. 3 is a section on line $x\,x$ of Fig. 2. Fig. 4 is a diagram illustrative of the S shape of the trap. Fig. 5 is a perspective view of a slight modification of the trap shown at Figs. 1, 2, and 3; and Fig. 6, as already stated, is a view of a trap embodying in its simplest form the main feature of the invention, modifications or improvements upon which are herein described and claimed.

B is the wash-basin. F is the discharge-pipe leading therefrom. I is the lower or inlet passage of the trap, forming the dip, and O is the upper or outlet passage, forming the overflow. P is the chamber intermediate between said dip and overflow, the same being a casting with a clean-out cap, C, which is readily removed, and may be made of glass. W is a waste-pipe leading from the outlet-passage O to the main discharge or waste pipe S. D is a partition in the said chamber.

In the normal condition of the apparatus when in use, the water stands up to the level of the overflow $m$. When through siphonic action a partial vacuum is created in the waste-pipe W, the water in the pipe F descends under the influence of the atmospheric pressure on its surface, tending to restore the equilibrium until it reaches the dip $i$. The air then, being lighter than water, passes into and through the chamber P, and drives a portion of the water not already driven out before it into the waste-pipe. The water remaining in the chamber falls back to, say, the level of the line $x\,x$, and maintains the seal of the trap. Subsequent siphonic action will not destroy the seal of the trap, for the following reason: The water standing in the pipe F after its partial removal, as just described, is again lowered by siphonic action to the dip $i$. Air again rushes into the chamber and waste-pipe W, and, passing into and through the water standing in the chamber, which is still shallow, although increased in depth by the water entering from the pipe F, projects upward a certain quantity of water in its passage with greater or less violence, according to the strength of the siphonic action. This water strikes the surface of the partition D or the top of the chamber, and is in part reflected back by it, and in part follows the air-current which passes over the water lying in the bottom of the chamber toward the opposite or further end of the chamber. Owing to the greater weight and momentum of the water, a part strikes the inner surface of this opposite end and is reflected back, and a small remaining portion only succeeds in following the air into the passage upon the other side of the partition. Of this small portion a part is again reflected back by the side of the chamber P, and, under very strong siphonic action, a few drops may reach the reflecting-surface or pocket $d$ at the nearer end of the chamber, whence it is thrown back, and the air alone, substantially free of water, escapes into the waste-pipe. The spray, striking the partition and other reflecting-surfaces, collects at the bottom of the chamber and restores or increases the depth of the seal. The partition D adds to the efficiency of the trap in furnishing additional reflecting or deflecting surface. More than this, it increases the length of the channel in which the shallow water may lie within the chamber at the expense of the width of the channel, thus promoting the self-scouring capacity of the trap without diminishing the amount of water lying in the chamber to maintain the seal, while it increases the distance which broken particles of air and water may travel in the chamber, and thus allows a better opportunity for their separation, and the escape of the air, and the retention of the water; and, again, the partition allows the apparatus to be constructed in a compact form, the dip and overflow communicating with the chamber at one end—one on one side of the partition and the other on the other side—thus preventing the chamber from sagging.

I do not in this application make the broad claim to a water-trap having between the lower bend or dip and the upper bend or overflow a long, narrow, and low chamber, the said dip and overflow communicating with the said chamber a distance apart practically equal to the distance that water may flow therein on a level, having made said broad claim in the application No. 110,630, of which this is now filed as a division.

I do claim herein—

1. The herein-described water-trap, consisting of the bent pipes I and O and the chamber P, the latter provided with the partition D, and the said pipes making connection with the chamber at one end thereof— one upon one side and the other upon the other side of the said partition—substantially as described.

2. The combination, with the bent pipes I and O, of the chamber P, the latter provided with the partition D and the cap C, and the said pipes communicating with said chamber at one end thereof—one upon one side and the other upon the other side of the said partition—substantially as described.

J. PICKERING PUTNAM.

Witnesses:
W. W. SWAN,
WM. S. ROGERS.